United States Patent
Eldridge

(10) Patent No.: US 7,034,245 B2
(45) Date of Patent: Apr. 25, 2006

(54) SYSTEMS AND METHODS FOR CONTROLLING PILOT ARC CURRENT IN AN ARC CUTTING OR WELDING MACHINE

(75) Inventor: Richard A. Eldridge, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 10/879,677

(22) Filed: Jun. 29, 2004

(65) Prior Publication Data

US 2005/0284849 A1    Dec. 29, 2005

(51) Int. Cl.
*B23K 9/00* (2006.01)

(52) U.S. Cl. ............... 219/121.57; 219/121.54

(58) Field of Classification Search ........... 219/121.54, 219/121.57, 130.31, 121, 59, 75, 130.4, 121.46, 219/121.59, 121.39, 121.45, 121.56, 121.48, 219/121.62

See application file for complete search history.

(56) References Cited

U.S. PATENT DOCUMENTS

| | | | |
|---|---|---|---|
| 3,809,850 A | 5/1974 | Saenger, Jr. | |
| 4,839,499 A | 6/1989 | Kotecki et al. | |
| 5,170,030 A | 12/1992 | Solley et al. | |
| 5,189,277 A | 2/1993 | Boisvert et al. | |
| 5,424,507 A | 6/1995 | Yamaguchi | |
| 5,506,384 A | 4/1996 | Yamaguchi | |
| 5,530,220 A | 6/1996 | Tatham | |
| 5,548,097 A | 8/1996 | Couch | |
| 5,630,952 A * | 5/1997 | Karino et al. | 219/121.57 |
| 5,831,237 A * | 11/1998 | Daniel | 219/121.54 |
| 5,844,197 A | 12/1998 | Daniel | |
| 5,847,354 A | 12/1998 | Daniel | |
| 5,866,869 A | 2/1999 | Schneider et al. | |
| 5,990,443 A | 11/1999 | Tatham et al. | |
| 6,133,543 A | 10/2000 | Borowy et al. | |
| RE37,608 E | 3/2002 | Solley et al. | |
| 6,566,625 B1 | 5/2003 | Hughes | |

* cited by examiner

*Primary Examiner*—Quang Van
(74) *Attorney, Agent, or Firm*—Alston & Bird LLP

(57) ABSTRACT

The systems and methods of the present invention provide a circuit for controlling the magnitude of the main and pilot arc current provided to an arc cutting or welding machine. In one embodiment, the circuit allows the user to set the pilot arc current such that it automatically tracks the main arc current setting. The pilot arc current is set to a value that is proportional to the main arc current, such that the pilot arc current value is tailored to the specific cutting operation to be performed and/or the specific nozzle and electrode being used. In an alternative embodiment, the circuit allows the user to select from different pilot arc current levels, such as low, medium, and high current levels. This allows the user to override the pilot arc control in instances where the plasma arc cutting or welding machine is operated under conditions not optimal for the selected nozzle and electrode.

20 Claims, 4 Drawing Sheets

SYSTEMS AND METHODS FOR CONTROLLING PILOT ARC CURRENT IN AN ARC CUTTING OR WELDING MACHINE

BACKGROUND OF THE INVENTION

1. Field of the Invention

The present invention relates generally to systems and methods for controlling the pilot arc current of an arc cutting or welding machine, and more particularly, to systems and methods for maintaining the pilot arc current at selected current levels or alternatively allowing the pilot arc current to track the setting for the main arc current.

2. Description of Related Art

An arc cutting or welding machine uses a torch containing an electrode and a nozzle. A path is defined between the nozzle and the electrode through which a pressurized working gas can flow and be directed toward a work piece. A current arc extends across the nozzle. The current arc is forced out of the nozzle by the pressurized gas, such that the current forms an arc at the tip of the nozzle that is akin to a flame on the end of the nozzle. The arc current has two modes. The first mode is a pilot mode, which occurs when the nozzle is away from the work piece. The second mode is a transferred or main arc current mode when the cutting system is used in cutting or welding a work piece.

FIG. 1 illustrates a configuration of a typical conventional arc cutting or welding machine. As illustrated, the torch 10 includes an electrode 10a and a nozzle 10b. A voltage source 12 is connected to the torch. The voltage source applies a negative voltage to the electrode 10a and a positive voltage to both the nozzle 10b and the work piece 14 to be cut. A gas source 16 supplies gas to the space between the electrode and nozzle.

During operation, an initial flow of gas is applied to the torch and a high frequency high voltage is applied between the electrode 10a and the nozzle 10b, whereby a spark discharge occurs. This spark discharge induces a pilot arc 18 between the electrode 10a and the nozzle 10b. The formation of the pilot arc creates a closed circuit path starting from the positive terminal of the voltage source 12 and passing through the nozzle 10b, the pilot arc, the electrode 10a, and finally returning to the negative terminal of the voltage source. When the torch is placed near the work piece 14, a part of the pilot arc 18 current begins to flow toward the work piece 14, whereby a main arc 20 is created. At this point, the pilot arc between the nozzle and electrode is replaced by the main arc between the electrode and work piece. When a cutting or other required operation is complete, a stop signal is applied to the voltage source so as to terminate the supply of power to the main arc 20, whereby the main arc 20 is extinguished. In some systems, the pilot arc is then reignited.

Most plasma torches have different sets of electrodes and nozzles for use with different types of materials to be cut or welded and/or to perform different types of cuts or welds. In general, the amount of pilot arc current in the pilot arc current mode needed to operate the torch is dependent upon the specific electrode and nozzle chosen for the cutting or welding operation. For example, one set of nozzles used to cut a thick material may be designed to operate at a higher current. In this instance, the pilot arc current would preferably have a higher current level than would be used with an electrode and nozzle configuration used at lower currents. The issue is that to date most arc cutting or welding machines do not regulate the pilot arc current. Instead, a maximum or close to maximum pilot arc current is used in all applications regardless of the type of nozzle and electrode employed. This higher pilot arc current can have deleterious effects on a nozzle and electrode designed for lower main current applications. For example, if the electrode and nozzle are designed for a lower current application, the use of a pilot arc current that is greater than what is needed can cause damage to the electrode and nozzle over time. While many manufacturers of arc cutting or welding equipment may regulate the transferred or main arc current based on nozzle type and work piece to be cut or welded, the pilot arc current is typically not regulated.

As such, systems and methods are needed that allow the pilot arc current to be altered based on either the particular nozzle being employed or the cutting operation to be performed, such that the pilot arc current is optimized for the given set-up and use of the arc cutting or welding machine.

An additional problem noted for many conventional plasma arc cutting or welding machines is deterioration of the nozzle and electrode due to rapid transition from pilot arc current to main arc current. Specifically, if the transition occurs too rapidly, the electrode may experience a condition referred to as "spitting" that deteriorates the electrode.

BRIEF SUMMARY OF THE INVENTION

The present invention provides systems and methods that overcome these and other disadvantages of the prior art. Specifically, the systems and methods of the present invention provide a circuit for controlling the magnitude of the pilot arc current provided to a machine such as a plasma arc cutting or welding machine. In one embodiment, the circuit allows the user to set the pilot arc current such that it automatically tracks the main arc current setting. In this embodiment, the pilot arc current is set to a value that is proportional to the value set by the user for the main arc current. As the user changes the setting for the main arc current, the pilot arc current is changed to a proportional setting. This, in turn, allows the pilot arc current value to be tailored to the specific cutting or welding operation to be performed and/or the specific nozzle and electrode being used. In an alternative embodiment, the circuit of the present invention allows the user to select from different pilot arc current levels, such as low, medium, and high current levels. This essentially allows the user to override the pilot arc control in instances where the plasma arc cutting or welding machine is operated under conditions not optimal for the selected nozzle and electrode.

In particular, the system and methods of the present invention provide a circuit connected to the input of a voltage generator, such as a pulse width modulator, used to provide both a pilot arc current and a main arc current to the electrode and nozzle of an arc cutting or welding machine. The circuit of the present invention is part of a feedback loop that is used by the voltage source to control the pilot arc current and main arc current. Importantly, the circuit of the present invention allows an operator to control both the main arc current setting and the pilot arc current setting provided to the voltage source.

In this regard, the circuit of the present invention provides a pilot arc current control switch and a main arc current control switch. The pilot arc current control switch allows the operator several selections. The operator can either select discrete values for the pilot arc current such as, low, medium, or high, or the operator may select that the pilot arc current follow or track the main arc current setting. The main arc current control switch allows the operator to select a main arc current value to be used when the plasma arc cutting or welding machine is operating in a main arc current mode.

The circuit of the present invention further includes first and second current sensors. The first current sensor is configured to sense the pilot arc current supplied to the plasma arc cutting machine, while the second current sensor is configured to sense both the pilot arc current and the main arc current supplied to the plasma arc cutting machine. Importantly, when the plasma arc cutting or welding machine is operating in a pilot arc mode, the circuit of the present invention compares the actual pilot arc current from the current sensor to the selected pilot arc current setting selected by the user. Any difference between the sensed and selected pilot arc current values is represented as a pilot arc current error value. This error value is applied to the voltage source, which adjusts the current supplied to the plasma arc cutting or welding machine to thereby null the error value.

Similarly, when the plasma arc cutting or welding machine is operating in a main arc current mode, the sensed main arc current supplied to the plasma arc cutting or welding machine is compared to the selected main arc current. Any difference between the sensed and selected main arc current values is represented as a main arc current error value. This error value is applied to the voltage source, which adjusts the current supplied to the plasma arc cutting or welding machine to thereby null the error.

In one embodiment, the circuit of the present invention further includes a capacitor and resistor network for regulating the transition between pilot and main arc current modes. Specifically, the capacitor and resistor network is connected to the pilot arc current error signal and the main current selection signal. A first resistor is located between the pilot arc current error signal and the capacitor, and a second resistor is connected between the capacitor and the main arc current selection signal. The first resistor is selected such that it has a resistance value that is several magnitudes smaller than the second resistor. During the pilot arc mode, the capacitor is charged by the pilot arc current error signal through the first resistor, and in the main arc current mode, the capacitor discharges to the input of the voltage source through the second capacitor. As the second resistor has a fairly large resistance value, the capacitor discharges at a slower rate, thereby creating a controlled transition from pilot arc current to main arc current, which can reduce degradation of the electrode of the arc cutting or welding machine. Further, in the pilot arc current mode, the capacitor is more rapidly recharged due to the lower resistance value of the first resistor. As such, the capacitor and resistor network of the present invention allows for a controlled transition from pilot arc to main arc, while at the same time providing a faster transition from main arc current to pilot arc current.

These and other aspects of the systems and methods of the present invention are provided in greater detail below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As mentioned, the systems and methods of the present invention provide a circuit that allows the user to select appropriate current levels for both the main arc current and the pilot arc current to be supplied to a machine, equipment, circuit, or the like. The embodiments below describe the circuit for use in an arc cutting or welding machine. It must be understood that this is only one example of the use of the systems and methods of the present invention. It is envisioned that the concepts embodied in the present invention may be employed in any application requiring use of two or more different currents, where individual control of the currents is necessary for proper operation. Furthermore, the embodiments described below include specific values for the various resistors, capacitors, etc. used in the circuits. It must be understood that that these illustrated values are for a specific application of the invention. These specific values should in no way be considered as limiting the scope of the circuits described herein for use in other applications.

Figure 1:
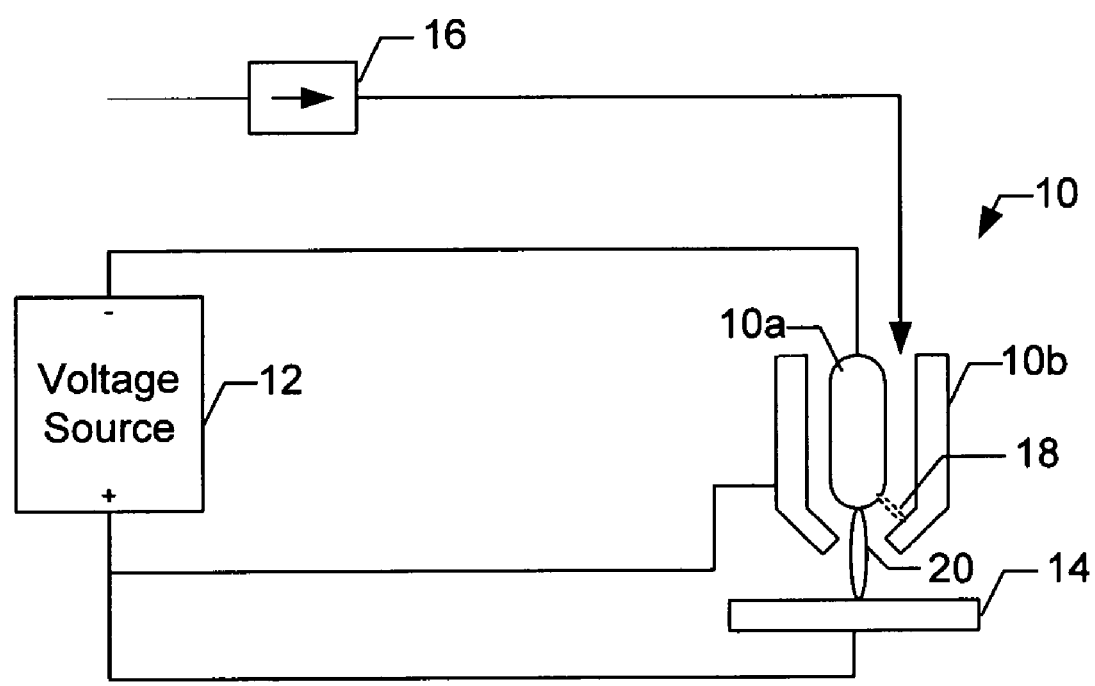
FIG. 1 is an operational block diagram depicting a conventional arc cutting or welding machine in which the system and methods of the present invention may be implemented.
Figure 2:
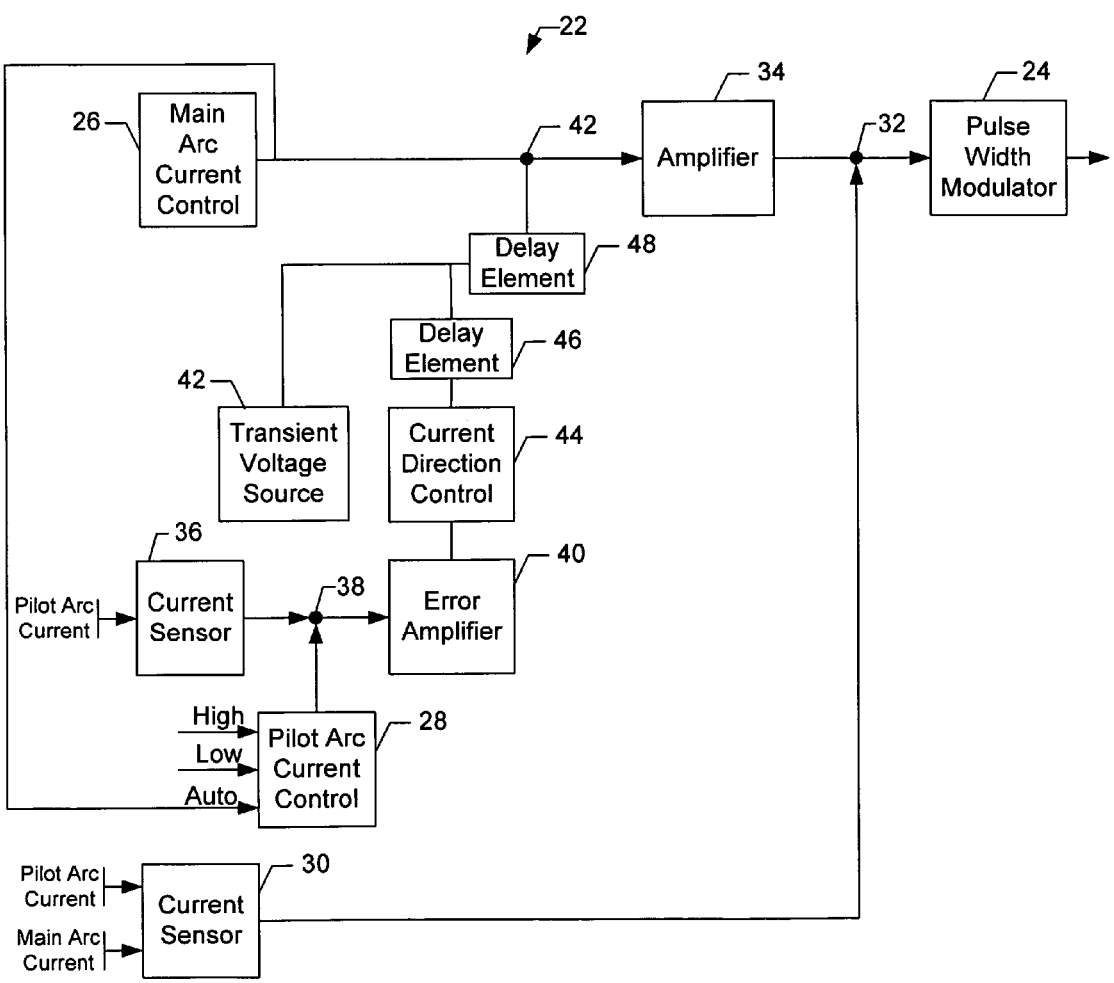
FIG. 2 is an operational block diagram illustrating the general operations of a current control circuit according to one embodiment of the present invention.

FIG. 2 illustrates a generalized block diagram configuration of the present invention. As illustrated, the systems and methods of the present invention provide a control circuit 22 connected to the input of a voltage source 24, such as a pulse width modulator. The circuit includes two control switches 26 and 28. The first control switch 26 is a main arc current control switch. This switch is used to set the current level output by the voltage source 24 during main arc operation of the cutting machine. The switch provides a reference signal indicating the main arc current level selected by the user. The second control switch 28 is a pilot arc control switch. This switch is used to set the current level output by the voltage source 24 during pilot arc operation of the cutting machine. The switch provides a reference signal indicating the pilot arc current level selected by the user. The switches may take any form. For example the switches may be mechanical switches, such as throw switches or potentiometers, or they may be electronically controlled switches, such as transistors, etc.

As illustrated, the pilot arc control switch 28 typically has two or more current settings. For example, the control switch may allow a user to select from a set of predetermined current settings such as a high, medium, or low current settings. The currents for each of the settings are typically predetermined and selectable by the user. As an alternative, the high, medium, and low current settings could be replaced with a variable resistor, such as a potentiometer that will allow the user to tune to a desired current level.

These different settings are typically used in instances where the cutting or welding machine is operated under conditions not optimal for the selected nozzle and electrode. For example, if the nozzle and electrode of the machine is designed for high current operation, but the user is using the machine for a low or medium current application, the user may select the appropriate medium or low current setting to thereby scale the pilot arc current for the given task.

As mentioned, the circuit includes a main arc current control switch 26. This switch includes either a set of discrete current selections or is a variable switch, such as a potentiometer. The main arc current control switch allows the user to select a main arc current to match with either the nozzle and electrode employed, the particular cutting operation to be performed, or both. In this way, the user can ensure that the main arc current is scaled for the particular parameters of the cutting machine.

Returning again to the pilot arc control switch 28, the pilot arc control switch 28 also includes an auto setting. The auto setting essentially connects the pilot arc current setting to the output main arc current control switch 26, such that the pilot arc current setting will track the main arc current setting selected by switch 26. Specifically, in this embodiment, the pilot arc current is proportional to the main arc current, such that the pilot arc current can also be appropriately scaled to the particular parameters of the cutting machine or the operations to be performed with the cutting machine.

In addition to the main arc and pilot arc control switches, 26 and 28, the circuit 22 of the present invention also includes various devices for comparing the selected main and pilot arc currents with the actual current values supplied to the cutting machine, so that the current source 24 can properly regulate the main and pilot arc currents. Specifically, the circuit includes a current sensor 30 connected to main arc current supplied to the cutting machine. The output of the current sensor 30 and the main arc current control switch 26 are connected at node 32. During main arc current operation of the cutting machine, the sensed main arc current is compared to the selected main arc current. Any difference is considered an error, which is presented at node 32. The error is supplied to the voltage source 24, which alters the amount of main arc current supplied to the cutting or welding machine based on this error to thereby drive the error value to null. As illustrated, an amplifier 34 may be used to scale the selected main arc current prior to comparison with the sensed main arc current so that the two values at node 32 are properly scaled.

The circuit 22 of the present invention uses two current sensors, 30 and 36, for controlling the pilot arc current provided to the cutting machine. Specifically, the current sensor 36 senses the pilot arc current supplied by the voltage source 24 to the arc cutting or welding machine. This sensed pilot arc current is then compared with the selected pilot arc current determined by the pilot arc current control switch 28. This comparison generates a pilot arc error signal at node 38. The error signal is typically amplified by a pilot arc current error amplifier 40. The pilot arc error signal is fed via the amplifier 34 to the voltage source 24, which alters the pilot arc current to drive the error to null.

In addition to allowing a user to control both the main and pilot arc current levels, the systems and methods of the present invention may also provide a mechanism to control transition between main arc and pilot arc modes. As discussed previously, abrupt transitions from pilot arc to main arc current may cause electrode deterioration. To remedy this, in some embodiments, the systems and methods include a transient voltage source 42 and a current control direction element 44 in the circuit. The transient voltage source 42 is typically a capacitor that is connected to the current control direction element 44 by first delay element 46 and to the selected main arc current by a second delay element 48. The first and second delay elements, 46 and 48, are configured so as to create a charge/discharge profile that allows for a time controlled transition from pilot arc to main arc current, while also providing a current transition from main arc current to pilot arc current that is fairly rapid. In this regard, the second delay element 48 is relatively large compared to the first delay element 46.

In operation, during the pilot arc current mode, the pilot arc current error value charges the transient voltage source 42 via the first delay element 46. When the arc cutting or welding machine is transitioned to main arc mode, the voltage source 42 discharges through the second delay element 48 to voltage source. Due to the large value of the second delay element, the voltage source discharges at a slower rate, thereby creating a controlled transition from pilot arc current to main arc current. When the arc cutting or welding machine is again transitioned to the pilot arc mode, the pilot arc current error signal again charges the transient voltage source 42 via the first delay element 46. Due to the lower value of the first delay element 46, the transient voltage source is rapidly recharged.

The transient voltage source and delay elements essentially create an asymetrical charge/discharge profile for a controlled rate of increase in current when transitioning from pilot to main arc current mode and a rapid decrease when transitioning from main to pilot arc current mode. The controlled rate of transition to main arc current mode minimizes "spitting" of the electrode and the rapid decrease to pilot arc current mode prevents damage caused by excessive time/current product on the nozzle.

Figure 3:
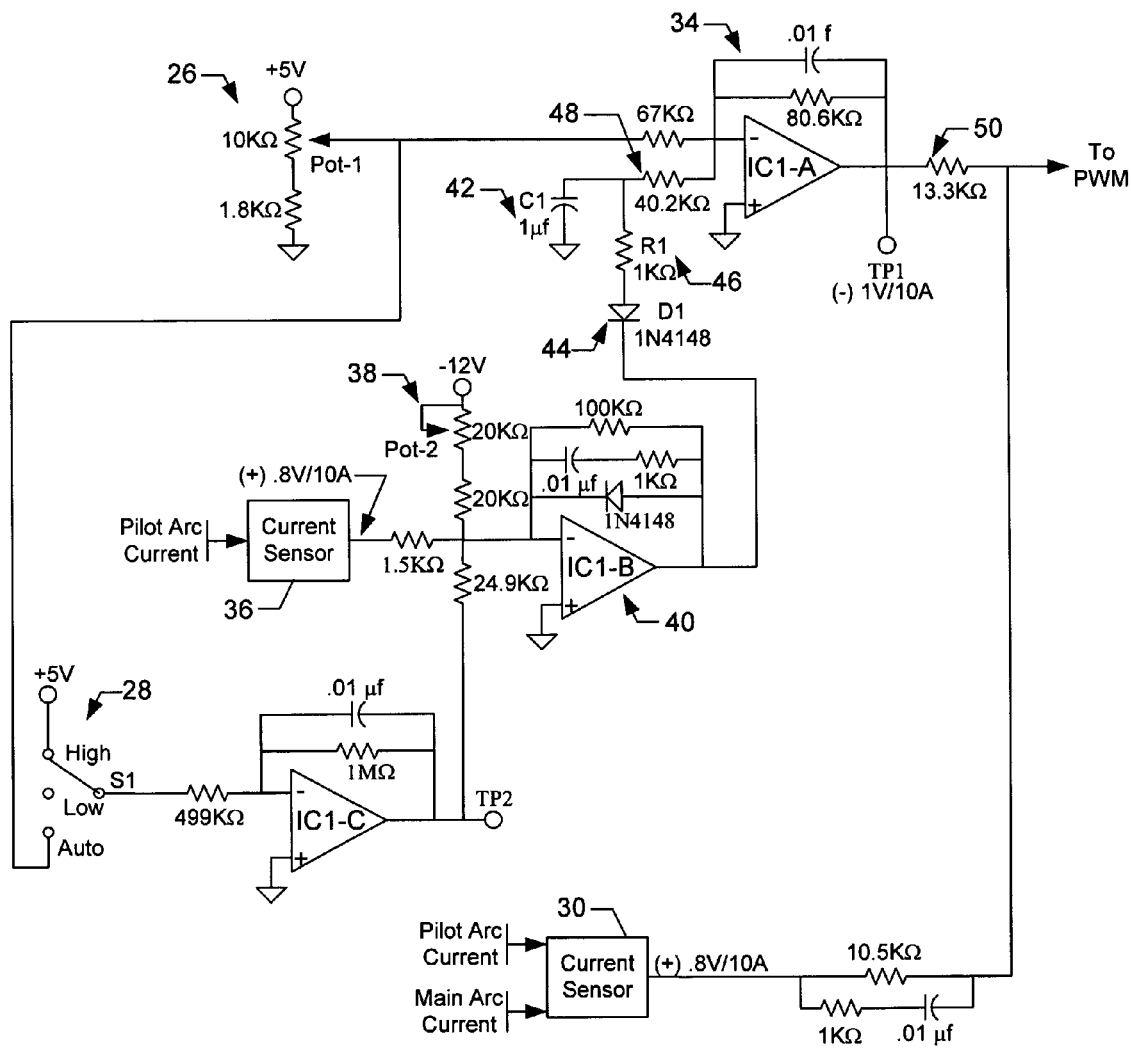
FIG. 3 is a circuit diagram of a current control circuit according to one embodiment of the present invention.

FIG. 2 is a generalized block diagram of the present invention. FIG. 3 is an illustration of specific implementation of the present invention for use in a plasma arc cutting or welding machine. As illustrated in this embodiment, the main arc current control switch 26 is a potentiometer. Further and importantly, the pilot arc current control switch 28 is a selector switch capable of being placed in three different positions. The pilot arc control switch is connected to an amplifier IC1-C. The first position is "high" position defining a high pilot arc current setting. In the illustrated embodiment, the high input is a set voltage of 5 volts. In other embodiments, the voltage may be set by a variable voltage supply, potentiometer, etc.

The second position is a "low" position defining a low pilot arc current setting. In the illustrated embodiment, this value is set by a potentiometer 38. Specifically, when the pilot arc current control switch 28 is placed at the low position, the amplifier IC1-C outputs a null value. The potentiometer 38 thus provides the selected pilot arc current, which is compared with the sensed current provided by the current sensor 36.

Importantly, the "auto" position connects the input of the pilot arc current selector switch 28 to the output of the main arc current selector switch 26. In this mode, the pilot arc current tracks the main arc current. The setting of the potentiometer Pot-1 defines both the main arc and pilot arc current settings in this mode.

Further, as illustrated, the pilot arc current error amplifier 40 and amplifier 34 are embodied in inverting operational amplifiers, IC1-B and IC1-A, respectively.

In general, IC1-A generates a signal with the amplitude of (−) 1 volt per 10 amps. This signal is compared to the output of current sensor 30 and the error feeds to the PWM circuit.

Current sensor 30 is positioned to sense the current flowing in the electrode circuit which can be either pilot arc current, cutting current, or a combination of the two. Current sensor 36 is positioned to sense only pilot arc current. When no pilot arc current is flowing, or the pilot arc current is less that the pilot arc set current, the output of IC1-B is null and the voltage at TP1 reflects the setting of Pot-1 with no interference from the pilot arc circuit. For example, if the wiper of Pot-1 is at 5 volts TP1 will be at (−)6.0 volts, indicating a desired 60 amps output as measured by sensor 30. When pilot arc current flows, it is sensed by both Sensor 30 and 36, and without interference from IC1-B would regulate at 60 amps. As the current sensed by sensor 30 exceeds the pilot arc reference (e.g., 15 amps), IC1-B goes negative causing TP1 to go positive (less negative). The circuit will reach equilibrium when TP1 reaches (−)1.5 volts and the current sensed by sensor 30 reaches 15 amps. As the arc transitions from pilot arc to main arc IC1-B output approaches null and allows TP1 to return to the value dictated by the Pot-1 setting. The function of the pilot arc sensor and error amplifier is to modify (or override) the reference to the main current control.

In operation, the user initially sets the main arc current control switch and pilot arc control switch. In the high position, 5 volts would be fed to the amplifier IC1-C, which in turn, would cause a voltage at TP2 of −10 volts. In the low position, the voltage at TP2 is 0 volts and the pilot arc current is set by the potentiometer 38. In the auto position, the voltage TP2 varies from low to high. For example, in the illustrated configuration, if the potentiometer 38 is set at midpoint, the minimum pilot arc current is 7.5 amps. With the main arc current control switch 28 set to a maximum of 5 volts, the current increases to 15 amps and can vary down to 7.5 amps.

After the user has selected the appropriate settings for the pilot and main arc currents, the arc cutting or welding machine is turned on, and the voltage source 24 provides a pilot arc current to the are cutting or welding machine. During this mode of operation, a voltage difference at resistor 50 indicates an error difference between the pilot arc current being supplied to the cutting machine and the pilot arc current selected by the user. This voltage is a pilot arc current error signal that is provided as an input to the pulse width modulator, which alters the pilot arc current to drive the voltage on resistor 50 to 0 volts, i.e., no error.

When the torch of the arc cutting or welding machine is brought in contact with a work piece, the current transitions to a main arc current. At this point, the output of the pilot arc error amplifier IC1-B is 0 volts and the voltage at the resistor 50 is the difference between the main arc current supplied to the cutting machine and the selected main arc current as designated by the main arc current control switch 26. This voltage difference is a main arc current error that is applied to the pulse width modulator, which alters the current provided to the cutting machine so as to drive the voltage on resistor 50 to 0 volts.

As illustrated in FIG. 3, the circuit 22 of this embodiment may also include elements for controlling the transition from pilot arc current to main arc current and from main arc current to pilot arc current. Specifically, the circuit includes a diode 44, capacitor 42, and two resistors 46 and 48. As will be noted, the resistor 48 connected between the capacitor and the selected main current control has a large resistance value relative to that of the resistor 46 connected between the output of the pilot arc error current amplifier 40 and the capacitor 42. In this particular embodiment, the ratio is 40:1.

The resistor values are selected to provide a desired charge/discharge curve for the capacitor 42.

Figure 4:
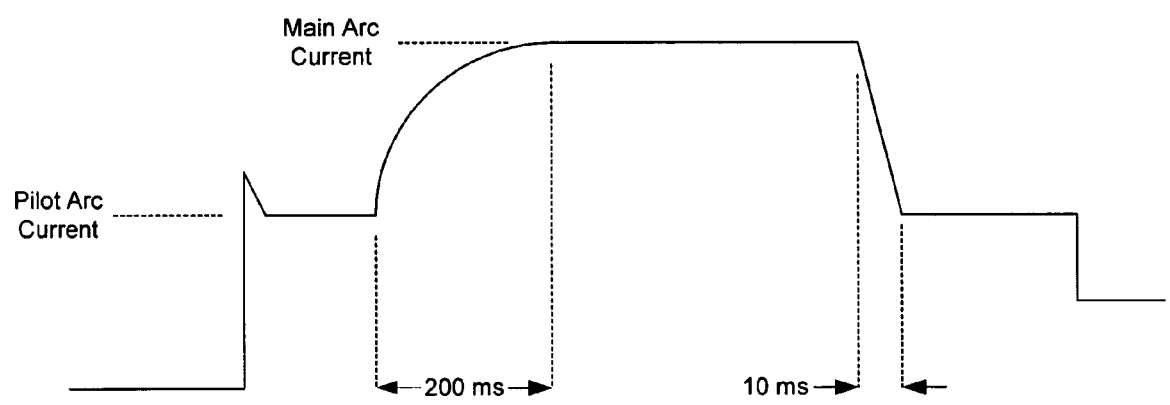
FIG. 4 is a graph of amplitude versus time illustrating the transition between pilot arc current and main arc current according to one embodiment of the present invention.

Specifically, FIG. 4 illustrates an example of the charge/discharge curve for a capacitor 42 used in the circuit of the present invention. As illustrated, in the pilot arc mode, the capacitor 42 is charged by the pilot arc error amplifier through resistor 46. When the cutting machine is transitioned to main arc mode, the pilot arc error current amplifier 40 falls to 0 volts output. At this point, the capacitor 42 begins to discharge through resistor 48. The discharge of the capacitor creates a transition over time from the pilot arc current to the main arc current. The discharge time is a function of the capacitor and resistor. The discharge time can be lengthened by choosing a larger resistor value or less by choosing a smaller resistor value. As illustrated in FIG. 4, the illustrated circuit provides a discharge period of approximately 200 milliseconds. When the cutting machine again returns to pilot arc current mode, the pilot arc error current amplifier 40 again generates a voltage that charges the capacitor 42 through the resistor 46. As the resistor 46 has a small resistance value, the charge time for the capacitor is fairly quick, such as 10 milliseconds. Here again, the charge time can be altered by changing the value of the resistor 46.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for controlling the pilot arc current supplied to an arc cutting or welding machine, said system comprising:
    an output voltage source connected to the arc cutting or welding machine for providing both a pilot arc and main arc current thereto;
    a main arc current control device connected to an input of said output voltage source, said main arc current control device providing a first reference signal to said output voltage source indicating the desired level of main arc current to be output by said output voltage source to the arc cutting or welding machine; and
    a pilot arc current control device connected to an input of said output voltage source for providing a second reference signal to said output voltage source indicating the desired level of pilot arc current to be output by said output voltage source to the arc cutting or welding machine, said pilot arc current control device capable of providing the second reference signal that is one of:
        proportional to the first reference signal output by said main arc current control device, such that the pilot arc current tracks the main arc current; and
        at least one specific value set by a user.

2. A system according to claim 1, wherein the specific value set by the user for the second reference signal is determined by a variable reference voltage that can be varied by a user.

3. A system according to claim 1, wherein said outputs of said main arc current control device and said pilot arc current control device are connected to a common input of the output voltage source, such that controls for main arc current are input to the output voltage source during main arc mode and controls for pilot arc current are input to the output voltage source during pilot arc mode.

4. A system according to claim 1 further comprising a first current sensor for sensing the main arc current supplied by the output voltage source to the cutting and welding machine, wherein the first reference signal provided to said output voltage source is a difference signal representing a difference between an output of said main arc control device and the main arc current sensed by said first current sensor.

5. A system for controlling the pilot arc current supplied to an arc cutting or welding machine, said system comprising:
   an output voltage source connected to the arc cutting or welding machine for providing both a pilot arc and main arc current thereto;
   a main arc current control device connected to an input of said output voltage source, said main arc current control device providing a first reference signal to said output voltage source indicating the desired level of main arc current to be output by said output voltage source to the arc cutting or welding machine;
   a pilot arc current control device connected to an input of said output voltage source for providing a second reference signal to said output voltage source indicating the desired level of pilot arc current to be output by said output voltage source to the arc cutting or welding machine, said pilot arc current control device capable of providing the second reference signal that is one of:
   proportional to the first reference signal output by said main arc current control device, such that the pilot arc current tracks the main arc current; and
   at least one specific value set by a user,
   wherein said the outputs of said main arc current control device and said pilot arc current control device are connected to a common input of the output voltage source, such that controls for main arc current are input to the output voltage source during main arc mode and controls for pilot arc current are input to the output voltage source during pilot arc mode;
   a current direction controller connected in series with the output of said pilot arc current control device; and
   a transient voltage source in parallel with said current direction controller at a node,
   wherein during the pilot arc mode, said current direction controller allows current flow from said pilot arc current control device to the input of the output voltage source, the current also charges said transient voltage source, and
   wherein during the main arc mode, said current direction controller block current from said pilot arc current controller and said transient voltage source discharges to the input of the output voltage source.

6. A system according to claim 5 further comprising:
   a first delay element connected in series with said current direction controller; and
   a second delay element connect between the node and the input of the output voltage source,
   wherein said first delay element controls the rate that said transient voltage source is charged by said pilot arc current control device, and
   wherein said second delay element controls the rate at which the transient voltage source discharges to the output voltage source.

7. A system according to claim 6, wherein said second delay element has a larger delay characteristic than said first delay characteristic.

8. A system according to claim 6, wherein said first and second delay elements are resistive elements and said transient voltage source is a capacitive element.

9. A system for controlling the pilot arc current supplied to an arc cutting or welding machine, said system comprising:
   an output voltage source connected to the arc cutting or welding machine for providing both a pilot arc and main arc current thereto;
   a main arc current control device connected to an input of said output voltage source, said main arc current control device providing a first reference signal to said output voltage source indicating the desired level of main arc current to be output by said output voltage source to the arc cutting or welding machine;
   a pilot arc current control device connected to an input of said output voltage source for providing a second reference signal to said output voltage source indicating the desired level of pilot arc current to be output by said output voltage source to the arc cutting or welding machine, said pilot arc current control device capable of providing the second reference signal that is one of:
   proportional to the first reference signal output by said main arc current control device, such that the pilot arc current tracks the main arc current; and
   at least one specific value set by a user; and
   a second current sensor for sensing the pilot arc current supplied by the output voltage source to the cutting and welding machine, wherein the second reference signal provided to said output voltage source is a difference signal representing a difference between an output of said pilot arc control device and the pilot arc current sensed by said second current sensor.

10. A system for controlling the pilot arc current supplied to an arc cutting or welding machine, said system comprising:
    an output voltage source connected to the arc cutting or welding machine for providing both a pilot arc and main arc current thereto;
    a main arc current control device connected to an input of said output voltage source, said main arc current control device providing a first reference signal to said output voltage source indicating the desired level of main arc current to be output by said output voltage source to the arc cutting or welding machine; and
    a pilot arc current control device connected to an input of said output voltage source for providing a second reference signal to said output voltage source indicating the desired level of pilot arc current to be output by said output voltage source to the arc cutting or welding machine, said pilot arc current control device capable of providing the second reference signal that is proportional to the first reference signal output by said main arc current control device, such that the pilot arc current tracks the main arc current.

11. A system according to claim 10, wherein said outputs of said main arc current control device and said pilot arc current control device are connected to a common input of the output voltage source, such that controls for main arc current are input to the output voltage source during main arc mode and controls for pilot arc current are input to the output voltage source during pilot arc mode.

12. A system according to claim 11 further comprising:
    a current direction controller connected in series with the output of said pilot arc current control device; and
    a transient voltage source in parallel with said current direction controller at a node, wherein during the pilot arc mode, said current direction controller allows current flow from said pilot arc current control device to the input of the output voltage source, the current also charges said transient voltage source, and wherein during the main arc mode, said current direction controller block current from said pilot arc current controller and said transient voltage source discharges to the input of the output voltage source.

13. A system according to claim 12 further comprising:

a first delay element connected in series with said current direction controller; and a second delay element connect between the node and the input of the output voltage source, wherein said first delay element controls the rate that said transient voltage source is charged by said pilot arc current control device, and wherein said second delay element controls the rate at which the transient voltage source discharges to the output voltage source.

14. A system according to claim 13, wherein said second delay element has a larger delay characteristic than said first delay characteristic.

15. A system according to claim 13, wherein said first and second delay elements are resistive elements and said transient voltage source is a capacitive element.

16. A system according to claim 10 further comprising a first current sensor for sensing the main arc current supplied by the output voltage source to the cutting and welding machine, wherein the first reference signal provided to said output voltage source is a difference signal representing a difference between an output of said main arc control device and the main arc current sensed by said first current sensor.

17. A system according to claim 10 further comprising a second current sensor for sensing the pilot arc current supplied by the output voltage source to the cutting and welding machine, wherein the second reference signal provided to said output voltage source is a difference signal representing a difference between an output of said pilot arc control device and the pilot arc current sensed by said second current sensor.

18. A system for controlling the pilot arc current supplied to an arc cutting or welding machine, said system comprising:

an output voltage source connected to the arc cutting or welding machine for providing both a pilot arc and main arc current thereto;

a main arc current control device connected to an input of said output voltage source, said main arc current control device providing a first reference signal to said output voltage source indicating the desired level of main arc current to be output by said output voltage source to the arc cutting or welding machine; and a pilot arc current control device connected to an input of said output voltage source for providing a second reference signal to said output voltage source indicating the desired level of pilot arc current to be output by said output voltage source to the arc cutting or welding machine, said pilot arc current control device capable of providing the second reference signal that is proportional to the first reference signal output by said main arc current control device, such that the pilot arc current tracks the main arc current, wherein said the outputs of said main arc current control device and said pilot arc current control device are connected to a common input of the output voltage source, such that controls for main arc current are input to the output voltage source during main arc mode and controls for pilot arc current are input to the output voltage source during pilot arc mode;

a current direction controller connected in series with the output of said pilot arc current control device; and a transient voltage source in parallel with said current direction controller at a node, wherein during the pilot arc mode, said current direction controller allows current flow from said pilot arc current control device to the input of the output voltage source, the current also charges said transient voltage source, and wherein during the main arc mode, said current direction controller block current from said pilot arc current controller and said transient voltage source discharges to the input of the output voltage source.

19. A system according to claim 18 further comprising:

a first delay element connected in series with said current direction controller; and a second delay element connect between the node and the input of the output voltage source, wherein said first delay element controls the rate that said transient voltage source is charged by said pilot arc current control device, and wherein said second delay element controls the rate at which the transient voltage source discharges to the output voltage source.

20. A system for controlling the pilot arc current supplied to an arc cutting or welding machine, said system comprising:

an output voltage source connected to the arc cutting or welding machine for providing both a pilot arc and main arc current thereto;

a main arc current control device connected to an input of said output voltage source, said main arc current control device providing a first reference signal to said output voltage source indicating the desired level of main arc current to be output by said output voltage source to the arc cutting or welding machine;

a pilot arc current control device connected to an input of said output voltage source for providing a second reference signal to said output voltage source indicating the desired level of pilot arc current to be output by said output voltage source to the arc cutting or welding machine, said pilot arc current control device capable of providing the second reference signal that is proportional to the first reference signal output by said main arc current control device, such that the pilot arc current tracks the main arc current; and a second current sensor for sensing the pilot arc current supplied by the output voltage source to the cutting and welding machine, wherein the second reference signal provided to said output voltage source is a difference signal representing a difference between an output of said pilot arc control device and the pilot arc current sensed by said second current sensor.

* * * * *